Sept. 25, 1956  W. M. ALEXANDER ET AL  2,764,160
DEVICE FOR APPLYING EXPANDED ELASTIC RINGS
Filed April 1, 1953  4 Sheets-Sheet 2

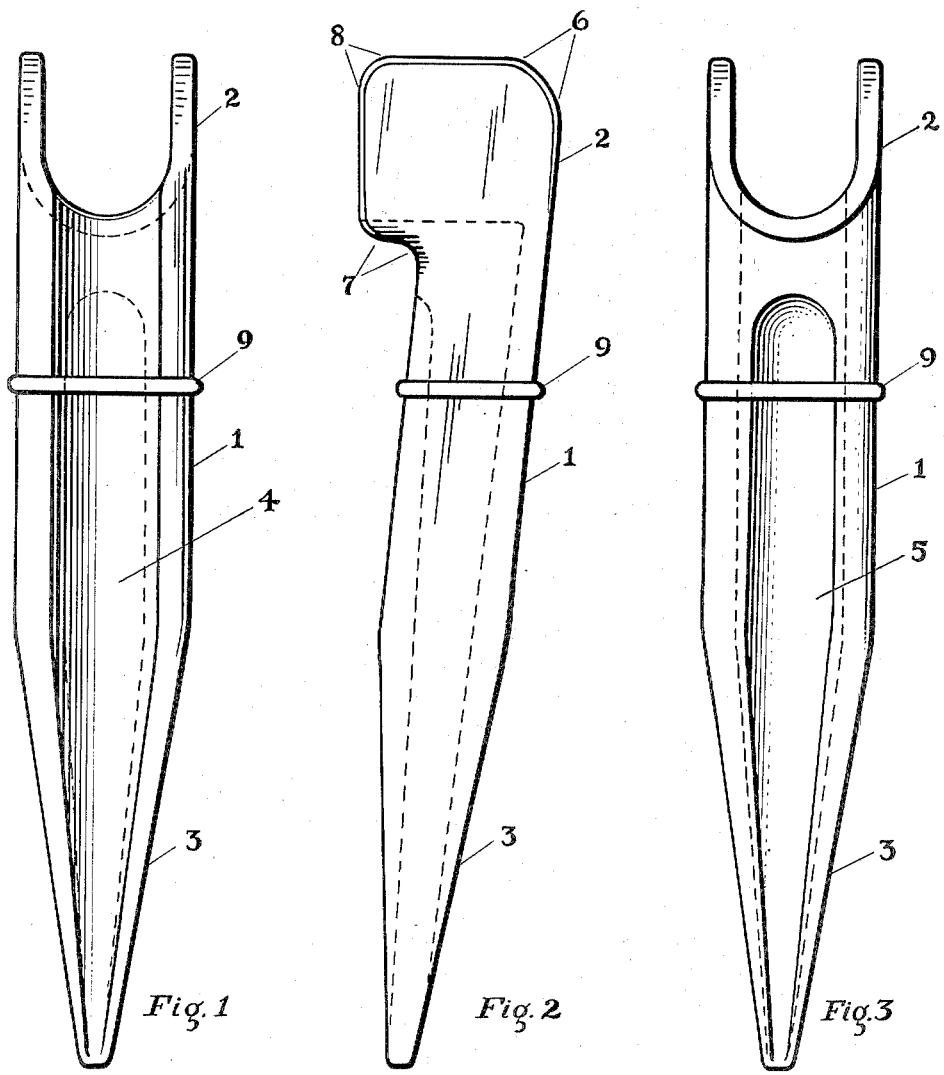

INVENTORS
WILLIAM M. ALEXANDER
WILLIAM K. McDONALD
JOHN W. LEE by John W. Lee
ATTORNEY Sept. 25, 1956     W. M. ALEXANDER ET AL     2,764,160
DEVICE FOR APPLYING EXPANDED ELASTIC RINGS
Filed April 1, 1953     4 Sheets-Sheet 3

INVENTORS
WILLIAM M. ALEXANDER
WILLIAM K. McDONALD
JOHN W. LEE
BY John W. Lee
ATTORNEY

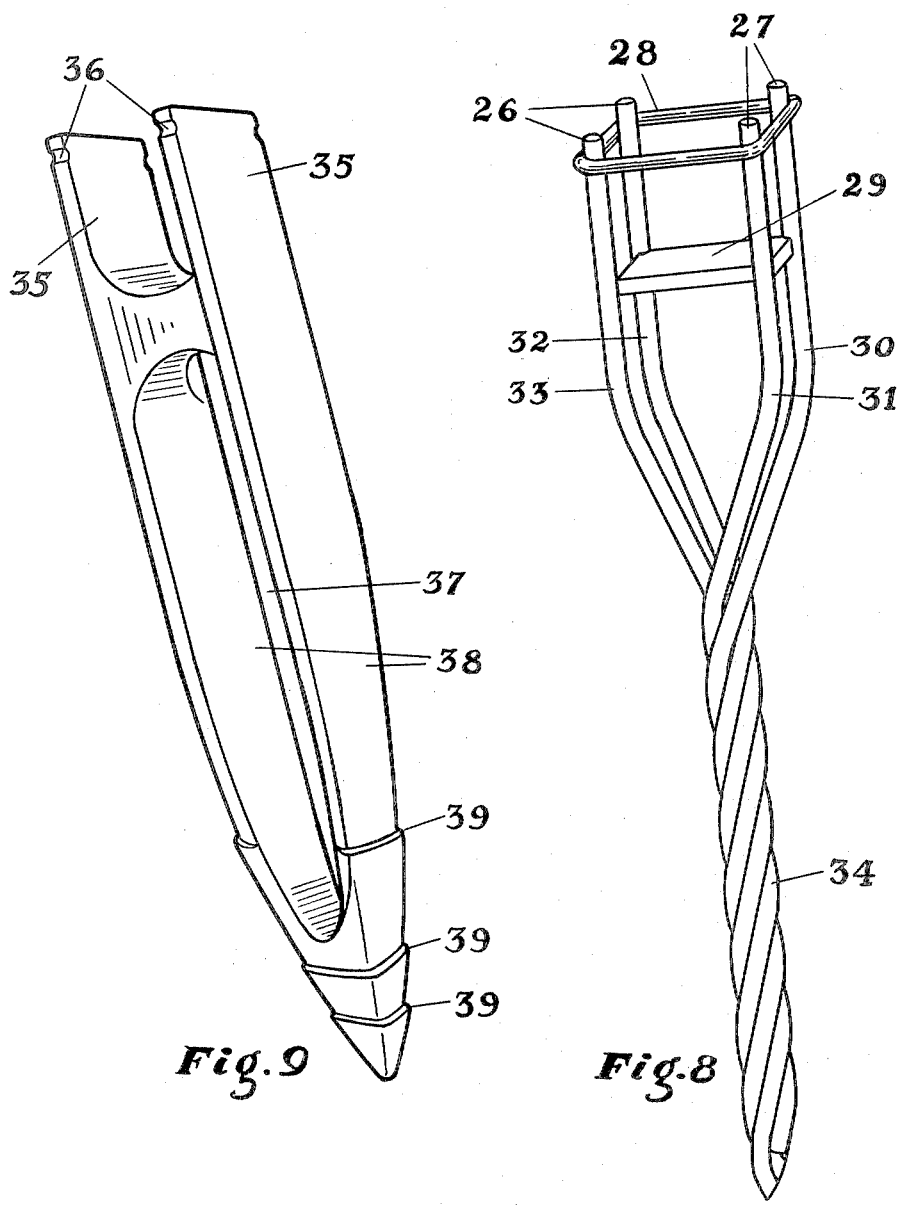

United States Patent Office 2,764,160
Patented Sept. 25, 1956

2,764,160

DEVICE FOR APPLYING EXPANDED ELASTIC RINGS

William M. Alexander, Martinsville, Ind., William K. McDonald, Van Nuys, Calif., and John W. Lee, Indianapolis, Ind., assignors to Allied Laboratories, Inc., Kansas City, Mo., a corporation of Delaware Application April 1, 1953, Serial No. 346,116

10 Claims. (Cl. 128—303)

The present invention relates to a device for expanding elastic rings and maintaining said elastic rings in an expanded condition so that they can be readily transferred to an appendage of an animal or other object.

In recent years, an important method of castrating calves and lambs and the docking of lamb's tails has involved applying rubber rings to the scrotum or on the tail in such a manner that the blood supply to such appendages is restricted—thus producing atrophy and subsequent sloughing. In carrying out such a process, the rubber rings are expanded to permit introduction of the appendage after which the rings are allowed to contract and remain in a predetermined position on the appendage. This method of castration and docking has some important advantages over the use of cutting instruments for castrating or tail docking; namely, there is no loss of blood, and the danger of shock to the animal is minimized.

In accordance with the present invention, we have discovered a very simple yet efficient device for expanding elastic rings and maintaining the elastic rings in an expanded position whereby they can be readily and easily transferred to appendages of an animal or other object.

In general, our invention relates to a device for applying elastic rings to an appendage of an animal or other object which comprises a rigid elongated body with a tapered end adapted for receiving a non-expanded elastic ring, the opposite end of said elongated body being a head member adapted for receiving an expanded elastic ring from the upper portion of said tapered body, said head member comprising spaced rigid supports adapted for maintaining the elastic ring in an expanded condition surrounding a passageway whereby an animal appendage or other object can be passed through said expanded ring and then externally of the device between the spaced rigid supports.

It is an important advantage of our invention that our device involves no mechanically moving parts, and hence, eliminates the possibility of wear and defects which accompany moving mechanical elements.

It is also an important advantage of our invention that our device can be economically produced.

Another important advantage of our device is that the elastic rings are maintained in an expanded position without requiring the operator to exert any gripping or similar action leaving the operator's hands free to manipulate the appendages or other objects to which the rings are being applied.

Another advantage of our invention is the ease of transferring the expanded elastic ring to the appendage or other object from our device.

The invention will be more particularly illustrated by the accompanying drawings wherein:

Figure 1 is a plan view of the back side of one modification of our device.

Figure 2 is a side plan view of the device of Figure 1.

Figure 3 is a front plan view of the device of Figure 1.

Figure 8 is a side perspective view (slightly rotated) of a different modification of our device.

Figure 9 is a side perspective view (slightly rotated) of still another modification of our device.

Figure 4:
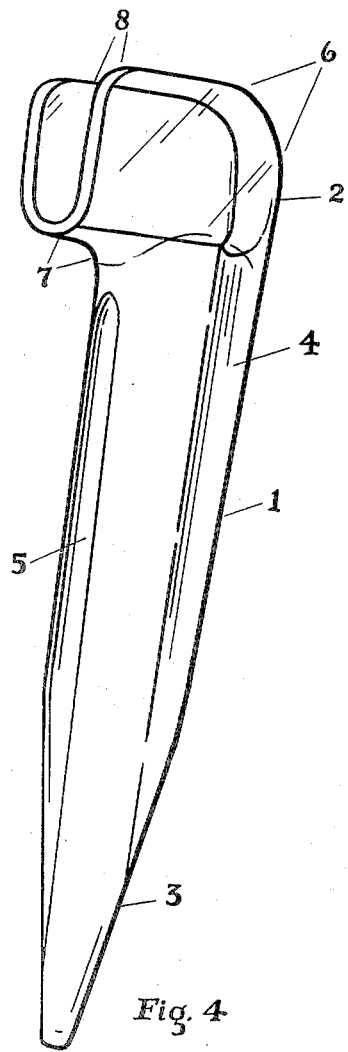
Figure 4 is a side perspective view (slightly rotated) of the device of Figure 1.

Referring to Figures 1, 2, 3 and 4 of the drawings, it will be seen that one form of our device comprises a handle or body 1 having on the upper end a head portion 2 embodying a semi-cylindrical form open at the top and each end. The head 2 is shown as a half-cylinder mounted on top and at a right angle to the axis of the body 1 with the curved portion of said half-cylinder attached to the top end of the body 1. The front side of head 2 protrudes a sufficient distance beyond the body 1 to receive an expanded rubber ring. The head 2 supported on the top of the body 1 is adapted to receive an expanded elastic ring from the said body 1 whereby the expanded elastic ring is maintained in an expanded position surrounding a channel or trough-way through which an object may be inserted and the expanded ring transferred to said object. The elastic ring supporting outer end of the trough-like head portion 2 is preferably, but not necessarily, mounted at right angles to the body 1. The handle or elongated body 1 preferably tapers at its lower end to a point 3. The back side of the device may have a grooved portion 4 which extends upward along the handle 1 and terminates in the head 2. The front side of the device may have a grooved portion 5 which terminates below the head portion 2. These grooves arranged along the axis are not essential, but they are desirable to permit the insertion of fingers beneath elastic rings to facilitate movement of said rings upward around the body 1 and subsequent placement on the head portion 2. The head or half-cylinder 2 has its back edges preferably curved as shown at 6, and the front portions curved as shown at 8. The curved edges 6 of the head 2 facilitate movement of an expanded elastic ring from the body 1 upward and onto the protruding portion of the head 2. The exact angle of the curved portion 6 is not important so long as the inside diameter of the elastic rings being used will be readily received. The curved areas 8 on the front top support members of the head 2 are at such an angle that rotation of the head away from an object inserted through the channel of the head 2 having an elastic ring positioned on the front protruding portion 7 of the head will result in transference of the elastic ring to the object. The head 2 extends outwardly as shown by the curved portion 7 to provide an area protruding beyond the handle 1 and adapted for holding an elastic ring in an expanded position. This modification is seen to comprise a device for applying elastic rings to an appendage of an animal or other object which comprises a rigid elongated body with a tapered end adapted for receiving a non-expanded elastic ring, a head member on the opposite end of said rigid elongated body, said head comprising a semi-cylindrical support adapted for receiving an expanded elastic ring from the upper portion of said tapered body portion, the said cylindrical support being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

Figure 5:
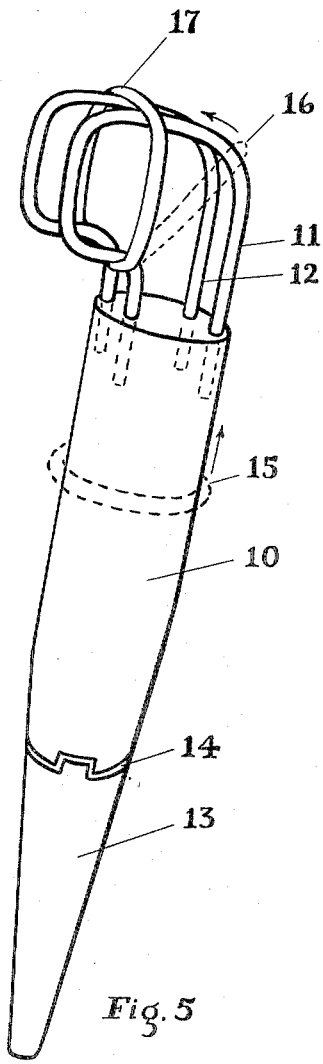
Figure 5 is a plan view of a different modification of our device.

In Figure 5, a modified device is shown which comprises a handle or body portion 10 which has a removable pointed lower end 13. The lower pointed or tapered end 13 is removably attached to the handle 10 as shown at 14 by a frictional joint. In this embodiment, the head portion comprises rods or wires 11 and 12 curved in such a manner that they produce the ring expanding head shown providing a troughway or channel surrounded by the expanded ring. The rods or wires 11 and 12 are embedded in the handle 10 as illustrated or otherwise rigidly attached thereto in such a manner that their back side is continuous with the back side of said handle 10. The elastic ring supporting outer part of the wire loop head member may be, but is not necessarily, at substantially a right angle to the body portion. In general, this modification comprises a device for applying elastic rings to an appendage of an animal or other object which comprises a rigid elongated body with a tapered end adapted for receiving a non-expanded elastic ring, a head member on the opposite end of said rigid elongated body, said head comprising fixed supports consisting of a pair of curved wire loops connected to the upper end of said elongated body portion, the said wire loops being adapted to maintain an elastic ring in an expanded condition surrounding a space through which an animal appendage can be passed, said head member also providing a space between said supports through which an animal appendage can be passed externally of the device after having been inserted through an expanded elastic ring position on said head member.

Figures 6, 7:
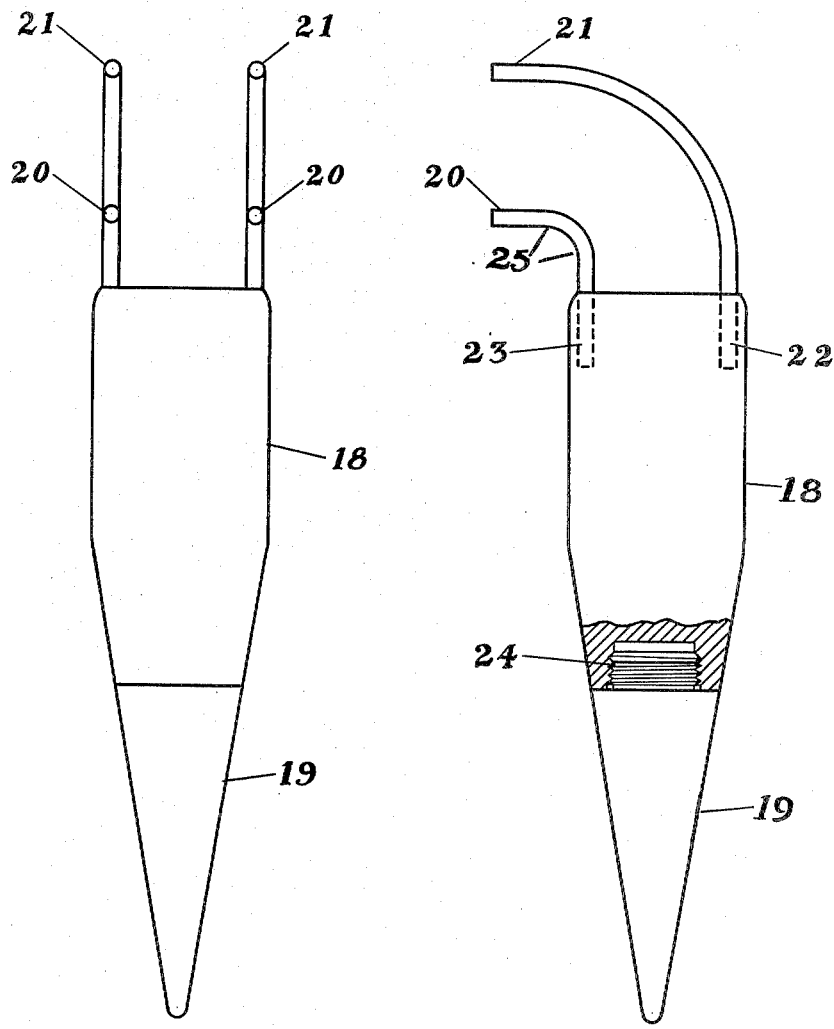
Figure 6 is a front plan view of another modification our our device.
Figure 7 is a side plan view of the device of Figure 6.

In Figures 6 and 7, a modification of our device is shown wherein curved studs or rods comprise the head member. The elongated body of this modification comprises a tapered lower end 19 which is removably attached to the upper handle portion 18 of the body through a threaded joint 24. Rods or studs 20 are curved as indicated at the point 25, and are embedded at the points 23 on the front side of the upper handle 18. Curved rods or studs 21 are rigidly embedded at the points 22 on the back side of the upper handle 18, being longer and curved in the same direction as the studs 20 to provide a head member with the studs being spaced as illustrated in Figure 6, and adapted for receiving an expanded elastic ring from the elongated handle portion 18. The elastic ring supporting outer ends of the studs are shown arranged at substantially a right angle to the body portion. In this case, our device comprises a device for applying elastic rings to an appendage of an animal or other object which comprises a rigid elongated body with a tapered end adapted for receiving a non-expanded elastic ring, a head member on the opposite end of said rigid elongated body, said head comprising a fixed arrangement of studs adapted for receiving an expanded elastic ring from the upper portion of said tapered body portion, the said studs being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

The modification illustrated in Figure 8 shows an elongated body or handle portion 34 comprising four spirally arranged wire rods coming to a point at the lower end and separating near the upper end as spaced individual rods 30, 31, 32 and 33 to form a head member. A spacing plate 29 is welded or otherwise secured to the rods 30, 31, 32 and 33 as illustrated to provide the spaced studs 26 and 27 which are adapted to hold an expanded elastic ring 28 in an expanded position producing a passageway through the expanded ring and then between the studs external of the device. In this modification our invention comprises a device for applying elastic rings to an appendage of an animal or other object which comprises a rigid elongated body with a tapered end adapted for receiving a non-expanded elastic ring, the opposite end of said elongated body having a head member adapted for receiving an expanded elastic ring from said tapered end, the head member comprising spaced fixed rod supports consisting of four rods extending beyond the upper end of said elongated body and adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

The modification of Figure 9 shows an elongated body 38 having a head member formed by spaced side extensions 35 of the body member 38. The notches 39 on the pointed lower end of the body member 38 serve as stopping points for an elastic ring being placed on the device. The spaced head member 35 may have notches 36 at the upper end thereof to keep an expanded elastic ring from being prematurely slipped off of the end. In this case, our invention comprises a device for applying elastic rings to an appendage of an animal or other object which comprises a rigid elongated body with a tapered end adapted for receiving a non-expanded elastic ring, a head member on the opposite end of said rigid elongated body, said head comprising spaced fixed supports consisting of a continuation of two opposite sidewalls of the rigid elongated body and adapted for receiving an expanded elastic ring from the upper portion of said tapered body portion, said supports being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

In utilizing the device illustrated in Figures 1, 2, 3 and 4, a rubber ring as illustrated by 9 in Figures 1, 2 and 3 is rolled up around the tapered portion 3 onto the upper portion of the handle or body 1. When the ring reaches the lower portion of the head 2, the ring is pulled up along the rear portion of the head 2, over the curved area 6, and brought to rest in an operative position surrounding the front protruding end portion of the head 2. The groove 4 facilitates the operator's hooking a finger under the rubber ring in order to pull it over the curved area 6 of the head 2. The area 7 holds the rubber ring 9 at this point while it is being expanded and moved onto the head 2. The groove 5 in the front of the handle facilitates moving the rubber ring 9 up along the handle 1. The handle portion 1 of our device is sufficiently long to enable an operator to hold it readily in his hand; and additionally when desired, as many as twenty-five rings may be placed on the handle. The operator can select the top-most ring, pull it into operative position on the head, and thus, have a supply of rings readily available.

In the modification illustrated by Figure 5, the tapered portion 13 can be removed, and an assistant operator can be applying rings thereto while the operator is using the rings placed on the upper handle portion 10. In this modification, the ring 15 is rolled upwardly as indicated by the arrow onto the curved wire head members 11 and 12. By inserting a finger underneath the ring and between the wires 11 and 12, the operator slides the ring to the position shown at 16 and subsequently into the operative position 17.

To transfer the rubber ring to a lamb's tail, for example, the rubber ring is first placed in an operative position as shown in Figure 5 at 17. While the front side of the device is held toward the lamb, the lamb's tail is inserted through the expanded rubber ring and then between the spaced supports and external of the device. The end of the tail is now grasped after passing through the head portion of our device and the expanded ring. The operator next tilts the head of the device away from the animal, and the rubber ring rolls over the front curved upper portion of the head and immediately contracts to firmly fix itself on the lamb's tail.

To use the device of Figures 6 and 7, an unexpanded elastic ring is rolled upward and around the pointed end 19 and onto the upper handle portion 18. From the handle 18, the rubber ring now in an expanded condition is moved upward onto the curved spaced rod or studs 20 and 21. The expanded ring is brought to rest near the outer end of the said studs comprising the head member. The lamb's tail or other object can now be passed from the front through the expanded elastic ring and externally of the device through the spaced studs. The expanded elastic ring is now slipped off the ends of the studs 20 and 21 onto the lamb's tail.

To use the device of Figure 8, an elastic ring 28 is rolled upward around the handle 34 on the spaced rods 30, 31, 32 and 33 and finally brought to rest near the tips 26 and 27. The lamb's tail is inserted downwardly through the ring thusly held in an expanded condition and then between the rod spacing support 29 and two of the studs 30, 31, 32 or 33. The elastic ring is then rolled off the tips 26 and 27 onto the lamb's tail at a predetermined point.

The device of Figure 9 is used by passing an elastic ring upwardly around the handle portion 38 onto the head formed by the spaced members 35 and finally brought to rest in the notches 36. The lamb's tail is passed downward through the expanded ring and then external of the device through one of the spaces between the members 35. The elastic ring is then slipped off the tip of the members 35 onto the lamb's tail at a predetermined point.

The half-cylinder head arrangement on our device for receiving and maintaining an elastic ring in an expanded position to provide a channel or troughway is the preferred one. However, the other head arrangements illustrated are likewise adapted to receive a rubber ring with an enlarged inside diameter and maintain the ring in an expanded condition to provide a channel or troughway through said expanded ring from which the ring can be slipped onto an animal appendage or other object passed through said channel or troughway.

It is readily seen from the foregoing that our invention relates to devices for applying elastic rings to an appendage of an animal or other object, which device comprises a rigid elongated body with a tapered end adapted for receiving a non-expanded elastic ring, a head member on the opposite end of said rigid elongated body, said head comprising spaced fixed supports adapted for receiving an expanded elastic ring from the upper portion of said tapered body portion. The spaced fixed supports which comprise the head portion of the tapered rigid elongated body must be arranged to receive an expanded elastic ring when the ring is moved upward and around the tapered end of the device. The spaced fixed supports must also be arranged to maintain the elastic ring in an expanded condition and permit an object such as a lamb's tail to be passed through the expanded ring and then through a space between the supports and external to the device. The protruding end of the lamb's tail can then be grasped in one hand of the operator; and by bringing the tail in direct contact with the elastic ring in the space between the fixed supports, the ring can be rolled off the supports onto the lamb's tail, or the operator can simply use his thumb to roll the ring off the end of the head member onto the lamb's tail.

Our device can be made in whole or in part of metal, plastic, wood, or other rigid materials. Likewise, they can be manufactured in a varity of sizes to permit a specific use. For example, a device best suited for the castration of calves may be somewhat larger than a device used for the castration or docking of lamb's tails.

The devices can be employed for application of elastic rings to objects other than appendages of animals. For example, we have found that our device can be very readily utilized for the application of elastic rings to feed bags to serve as closures therefor. The application of rubber rings to appendages of animals however, is one of the important uses of our device.

The above description of our device and its method of use are given for purposes of illustration, and it should be understood that reasonable modifications are included within the scope of our invention.

This is a continuation-in-part of our application Serial No. 219,022, filed April 3, 1951, and now abandoned.

We claim:

1. A device for applying elastic rings to an appendage of an animal or other object which comprises a rigid elongated body tapering to a point at one end and adapted for receiving a non-expanded elastic ring, the opposite end of said elongated body being a head member adapted for receiving an expanded elastic ring from the upper portion of said tapered body, said head member comprising spaced rigid supports adapted for maintaining the elastic ring in an expanded condition surroundings a passageway whereby an animal appendage or other object can be passed through said expanded ring and then externally of the device between the spaced rigid supports.

2. A device for applying elastic rings to an appendage of an animal or other object which comprises a rigid elongated body tapering to a point at one end and adapted for receiving a non-expanded elastic ring, a head member on the opposite end of said rigid elongated body, said head comprising spaced fixed supports adapted for receiving an expanded elastic ring from the upper part of said tapered body portion, said supports being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

3. A device for applying elastic rings to an appendage of an animal or other object which comprises a rigid elongated body tapering to a point at one end and adapted for receiving a non-expanded elastic ring, a head member on the opposite end of said rigid elongated body, said head comprising a semi-cylindrical support adapted for receiving an expanded elastic ring from the upper portion of said tapered body portion, the said cylindrical support being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

4. A device for applying elastic rings to an appendage of an animal or other object which comprises a rigid elongated body tapering to a point at one end and adapted for receiving a non-expanded elastic ring, a head member on the opposite end of said rigid elongated body, said head comprising a fixed arrangement of studs adapted for receiving an expanded elastic ring from the upper portion of said tapered body portion, the said studs being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

5. A device for applying elastic rings to an appendage of an animal or other object which comprises a rigid elongated body tapering to a point at one end and adapted for receiving a non-expanded elastic ring, a head member on the opposite end of said rigid elongated body, said head comprising fixed supports consisting of a pair of curved wire loops connected to the upper end of said elongated body portion, the said wire loops being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

6. A device for applying elastic rings to an appendage of an animal or other object which comprises a rigid elongated body tapering to a point at one end and adapted for receiving a non-expanded elastic ring, a head member on the opposite end of said rigid elongated body, said head comprising spaced fixed supports consisting of a continuation of two opposite sidewalls of the rigid elongated body and adapted for receiving an expanded elastic ring from the upper portion of said tapered body portion, said supports being adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

7. A device for applying elastic rings to an appendage of an animal or other object which comprises a rigid elongated body tapering to a point at one end and adapted for receiving a non-expanded elastic ring, the opposite end of said elongated body having a head member adapted for receiving an expanded elastic ring from said tapered end, the head member comprising spaced fixed rod supports consisting of four rods extending beyond the upper end of said elongated body and adapted to maintain an elastic ring in an expanded condition surrounding a space through which an animal appendage can be passed, said head member also providing a space between said supports through which an animal appendage can be passed externally of the device after having been inserted through an expanded elastic ring positioned on said head member.

8. A device according to claim 3 in which the elastic ring supporting outer end of the semi-cylindrical support is at substantially right angles to the body portion.

9. A device according to claim 4 in which the elastic ring supporting outer end of the fixed arrangement of studs are at substantially right angles to the body portion.

10. A device according to claim 5 in which the elastic ring supporting outer part of the said curved wire loops are at substantially right angles to the body portion.

References Cited in the file of this patent

UNITED STATES PATENTS

| 246,648 | Wilcox | Sept. 6, 1881 |
| 823,877 | Kellogg | June 19, 1906 |
| 1,301,708 | Knutson | Apr. 22, 1919 |
| 2,619,964 | Thaete | Dec. 2, 1952 |

FOREIGN PATENTS

| 140,237 | Australia | Feb. 14, 1951 |